Patented Mar. 13, 1923.

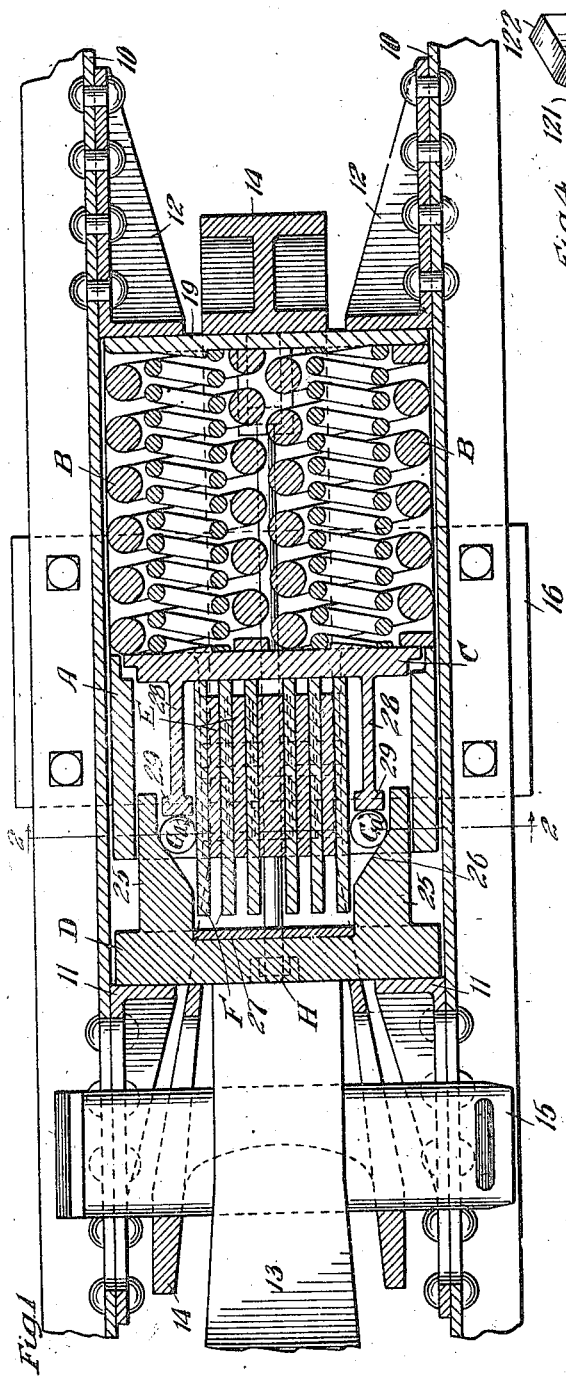
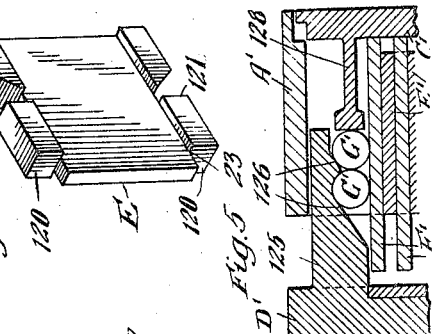
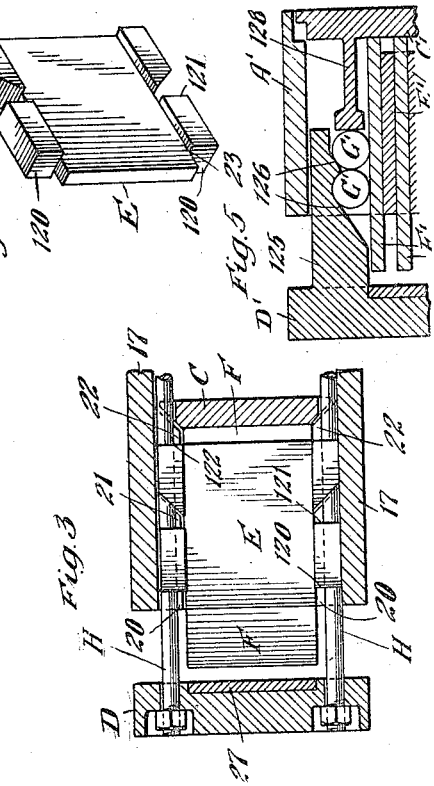
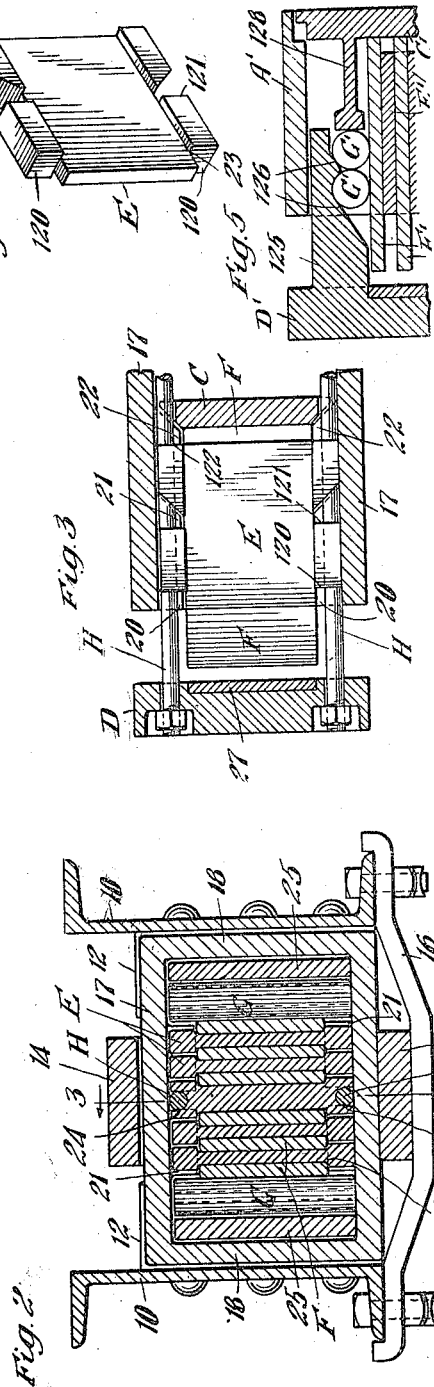

1,448,501

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

Application filed May 31, 1921. Serial No. 473,766.

*To all whom it may concern:*

Be it known that I, JOHN F. O'CONNOR, a citizen of the United States, residing at Chicago, in the county of Cook and State of Illinois, have invented a 'certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a friction shock absorbing mechanism especially adapted for railway draft riggings, and wherein are obtained high capacity, certain release, a smooth, easy and graduated action, relatively small pressure per unit of area on the co-operating friction elements, and a relatively small ultimate or peak load transmitted to the car underframe or other structure in which the mechanism is mounted.

More specifically, an object of my invention is to provide a friction shock absorbing mechanism wherein are employed series of relatively stationary and relatively movable intercalated friction plates in combination with a novel anti-frictional-acting wedging or lateral-pressure-creating system.

Other objects of the invention will more clearly appear from the description and claims appearing hereinafter.

In the drawing forming a part of this specification, Fig. 1 is a longitudinal horizontal sectional view of a portion of a railway draft rigging showing my improvements in connection therewith. Fig. 2 is a vertical transverse sectional view corresponding substantially to the line 2—2 of Fig. 1. Fig. 3 is a longitudinal vertical sectional view corresponding substantially to the section line 3—3 of Fig. 2. In Fig. 3, parts are broken away in order to better accommodate the view on the sheet. Fig. 4 is a detail perspective of one of the stationay friction plates employed in my improvements. And Fig. 5 is a broken longitudinal sectional view similar to Fig. 1, illustrating another embodiment of the invention.

Referring first to the construction illustrated in Figs. 1 to 4, inclusive, 10—10 denote channel draft sills of a car underframe, to the inner faces of which are secured front stop lugs 11 and rear stop lugs 12. The inner portion of a drawbar is indicated at 13, the same being operatively associated with the shock absorbing mechanism proper by means of a hooded cast yoke 14 and a coupler key 15. The yoke and parts therewithin are supported in operative position by a detachable saddle plate 16.

The improved shock absorbing mechanism as shown, comprises, broadly, a column-load-sustaining member, shell, or chambered follower A; twin spring resistances B—B; a spring follower C; a front follower D; a series of relatively stationary friction plates E—E; a series of relatively movable friction plates F; combined wedging and anti-friction rollers G—G; and retainer bolts H—H.

The member A, as shown, is of hollow box-like form at its outer or forward end, and is provided with upper and lower horizontal walls 17—17, side walls 18—18 and rear vertical integral wall 19, the latter functioning as a follower in conjunction with the stop lugs 12. Said side walls 18 are comparatively short, so as to leave the major portion of the sides of the member A open to permit of the insertion and removal of the spring follower C and twin springs B—B. The formation of the member A, at its forward end, provides what may be termed a casing to accommodate the intercalated friction plates.

On the inner sides, the upper and lower walls 17 of the member A, near the center thereof, are provided with vertically aligned inwardly-extending front ribs 20—20, intermediate ribs 21—21 and rear ribs 22—22. The ribs 21 and 22 are so formed as to provide forwardly-facing shoulders and the ribs 20 are formed to provide rearwardly-facing shoulders. The shoulders on said ribs 20, 21 and 22 co-operate with corresponding shoulders 120, 121 and 122, respectively, on the upper and lower thickened edges of the stationary plates E. The latter are mounted within the member A by first introducing them longitudinally to one side of the ribs and then shifting the plates E laterally in position on the ribs. In this manner, the plates E are anchored or held against longitudinal movement with respect to the member A, but are freely responsive to laterally applied pressure.

The stationary plates E are of substantially I-cross section, as best shown in Fig. 2. This formation provides longitudinally extending guides or channels 23 on the opposite sides of the plates E. Within said channels or guides 23 are accommodated the movable flat friction plates F, as best shown in Fig. 2. The central friction plate E, as shown in Fig. 2, is considerably thicker or heavier than those on either side thereof, so that it may be provided with longitudinally extending grooves 24 in the upper and lower edges thereof to accommodate the retainer bolts H. The intercalated series of stationary and movable friction plates E and F are preferably arranged in a single centrally-disposed group, as shown in Fig. 1, thereby leaving spaces on each side of the group to accommodate the lateral-pressure-creating means. In normal condition of the parts, the movable plates F extend outwardly of the member A and the inner ends of said plates F engage with the spring follower C.

The front follower D is formed with preferably integral wedge elements or extensions 25—25, one on each side thereof, each of said extensions having an inclined wedging face 26. Said wedging faces 26 diverge rearwardly, as shown in Fig. 1. On its inner side the follower D is preferably provided with a hardened plate insert 27 opposite the outer ends of the plates F, to thereby avoid gouging or indentation of the follower D when the latter pushes the plates F. Normally, there is a slight space, preferably one-half inch, between the co-operating portions of the follower D and plates F.

The spring follower C, on each side, is provided with preferably integral forward extensions or arms 28—28, each of which is laterally enlarged at its forward end, as indicated at 29, said enlargements 29 forming bearings for the anti-friction elements G, which also engage the wedge faces 26 and the adjacent outer faces of the two outermost plates F. In actual practice, the arms 28 will be made comparatively thin and of material capable of flexing small amounts without fracture or without danger of exceeding the elastic limit, for the reason hereinafter given.

The retainer bolts H are anchored at their rear ends in suitable hollow bosses formed integrally with the rear wall of the member A, and at their forward ends in suitable sockets provided in the follower D. The bolts H not only serve to retain all of the parts in proper assembled condition, but also may be utilized to place the springs under an initial compression so as to automatically compensate for wear as the mechanism continues in service.

The operation is as follows, assuming an inward or buffing movement of the drawbar. The inward movement of the drawbar forces the follower D simultaneously in the same direction. As the follower D, with its wedge extensions 25, moves rearwardly or inwardly, the tendency is to wedge or force the two rollers G inwardly from opposite sides of the group of intercalated friction elements. The bodily longitudinal movement of the rollers G relatively to the plates is prevented by the arms 28 of the spring follower C, this resistance being a yielding one on account of the twin springs B. Due to the fact that each of the rollers G has three different points of contact with members that form, in effect, a triangular closure therefor, there would be a tendency for the rollers G to slide or slip lengthwise of the plates F were not means provided to overcome the same. Said means are found in the flexible arms 28, which are adapted to yield laterally, so that the rollers G may roll upon the inclined wedge faces 26 and along the plates F, as indicated by the arrows a—a in Fig. 1. The tendency of the rollers G to rotate in the direction indicated induces the free ends of the arms 28 to flex slightly inwardly toward the center of the mechanism.

The inward movement of the follower D continues, as above described, with gradual increase of the lateral-pressure on the friction plates until the follower D finally engages the outer end of the plates F. At this point in the compression stroke, the desired lateral pressure will have been created, the same being dependent upon the spring resistance and the wedging angles. At the time the follower D engages the outer ends of the plates F, the spring follower C will have been displaced out of engagement with the inner ends of the plates F. During the remainder of the compression stroke, the plates F will be forced rearwardly relatively to the stationary plates E, thus generating a great amount of friction and affording a high capacity.

During the release, the initial expansion of the springs B forces the follower C outwardly, and the latter in turn forces the rollers G in the same direction, and, consequently, the follower D. During this initial portion of the release action, the spring follower C is not in engagement with the plates F, and, hence, the resistance to the release or decrease in wedging action of the mechanisms is at a minimum. After a slight outward movement of the follower C, it engages the inner ends of the plates F, and thereafter the plates F may be readily forced outwardly to their normal full release position.

Referring to the construction illustrated in Fig. 5, the column-load-sustaining member A', the stationary friction plates E' and the movable friction plates F' are, or may be, the same as in the other construction just described. The front follower D' is formed similarly to the follower D except that the wedge extensions 125 thereof are provided with two wedge faces 126—126. The spring follower C' is generally of the same form as the follower C, except that the resilient arms 128 are somewhat shorter than the arms 28. Instead of employing a single roller on each side of the group of friction plates, I employ two rollers G'—G', each of which engages one of the wedge faces 126. The operation of the mechanism is the same as that of the other construction previously described.

I have herein shown and described what I now consider the preferred manner of carrying out the invention, but the same is merely illustrative, and I contemplate all changes and modifications that come within the scope of the claims appended hereto.

I claim:

1. In a friction shock absorbing mechanism, the combination with a column-load sustaining member; of a series of relatively longitudinally immovable friction plates mounted thereon but freely responsive to lateral pressure; a series of intercalated relatively longitudinally movable friction plates; a spring resistance; and means for creating lateral pressure on said intercalated plates including, a longitudinally movable wedge having its wedge surface facing toward the friction plates, an anti-friction roller engaging said surface and the surface of the nearest friction plate, and a longitudinally movable bearing member engaging said roller on its side nearest the spring resistance.

2. In a friction shock absorbing mechanism, the combination with a column-load-sustaining member; of a series of relatively longitudinally immovable friction plates mounted thereon but freely responsive to lateral pressure; a series of intercalated relatively longitudinally movable friction plates; a spring resistance; and means for creating lateral pressure on said intercalated plates including, a longitudinally movable wedge having its wedge surface facing toward the friction plates, an anti-friction roller engaging said surface and the surface of the nearest friction plate, and a longitudinally movable bearing member engaging said roller on its inner side, said bearing member being laterally movable.

3. In a friction shock absorbing mechanism, the combination with a column-load-sustaining member; of a series of relatively longitudinally immovable friction plates mounted thereon but freely responsive to lateral pressure; a series of intercalated relatively longitudinally movable friction plates; a spring resistance; and means for creating lateral pressure on said intercalated plates including, a longitudinally movable wedge having its wedge surface facing toward the friction plates, an anti-friction roller bearing on said surface and the surface of the nearest friction plate, and a longitudinally movable relatively elongated laterally flexible bearing member engaging said roller on the inner side thereof.

4. In a friction shock absorbing mechanism, the combination with a column-load-sustaining member; of a series of relatively longitudinally immovable friction plates mounted thereon but freely responsive to lateral pressure; a series of intercalated relatively longitudinally movable friction plates; a spring resistance; and means for creating lateral pressure on said intercalated plates including, a spring follower located between the inner ends of said plates and the spring resistance, an outer longitudinally movable wedge having its wedge surface facing toward the friction plates, an anti-friction roller bearing on said surface and the surface of the nearest friction plate, and a forward extension from said spring follower having a bearing surface at the outer end thereof engaging the inner side of said roller.

5. In a friction shock absorbing mechanism, the combination with a column-load-sustaining member; of a series of relatively longitudinally immovable friction plates mounted thereon but freely responsive to lateral pressure; a series of intercalated relatively longitudinally movable friction plates; a spring resistance; and means for creating lateral pressure on said intercalated plates including, a spring follower located between the inner ends of said plates and the spring resistance, an outer longitudinally movable wedge having its wedge surface facing toward the friction plates, an anti-friction roller bearing on said surface and the surface of the nearest friction plate, and a forward extension from said spring follower having a bearing surface at the outer end thereof engaging the inner side of said roller, said extension being laterally flexible.

6. In a friction shock absorbing mechanism, the combination with a follower-acting member having an open ended casing at one end thereof; of a plurality of relatively stationary friction plates anchored within said casing against longitudinal movement but freely responsive to lateral pressure; a plurality of alternated friction plates movable longitudinally of the casing, said stationary and movable friction plates constituting a single centrally disposed group; a spring resistance; and means for creating lateral pressure from opposite sides inwardly of said group of plates including, an outer follower having inwardly extending wedges on opposite sides of the group of plates with the wedge surfaces thereof facing the plates, an anti-friction roller interposed between each said wedge surface and adjacent friction plate, and a longitudinally movable bearing member engaging the inner side of each of said rollers.

7. In a friction shock absorbing mechanism, the combination with a follower-acting member having an open ended casing at one end thereof; of a plurality of relatively stationary friction plates anchored within said casing against longitudinal movement but freely responsive to lateral pressure; a plurality of alternated friction plates movable longitudinally of the casing, said stationary and movable friction plates constituting a single centrally disposed group; a spring resistance; and means for creating lateral pressure from opposite sides inwardly of said group of plates including, an outer follower having inwardly extending wedges on opposite sides of the group of plates with the wedge surfaces thereof facing the plates, an anti-friction roller interposed between each said wedge surface and adjacent friction plate, and a longitudinally movable bearing member engaging the inner side of each of said rollers; said bearing members being each laterally movable at the end engaging the roller.

8. In a friction shock absorbing mechanism, the combination with a follower-acting member having an open ended casing at one end thereof; of a plurality of relatively stationary friction plates anchored within said casing against longitudinal movement but freely responsive to lateral pressure; a plurality of alternated friction plates movable longitudinally of the casing, said stationary and movable friction plates constituting a single centrally disposed group; a spring resistance; and means for creating lateral pressure from opposite sides inwardly of said group of plates including, an outer follower having a pair of integrally formed inwardly extending wedges disposed on opposite sides of the group of plates, the wedge surfaces thereof facing the plates, an anti-friction roller interposed between each wedge surface and the adjacent friction plate and a longitudinally movable laterally flexible bearing member on each side of the group of plates, each side bearing member having engagement with a roller.

9. In a friction shock absorbing mechanism, the combination with a follower-acting member having an open ended casing at one end thereof; of a plurality of relatively stationary friction plates anchored within said casing against longitudinal movement but freely responsive to lateral pressure; a plurality of alternated friction plates movable longitudinally of the casing, said stationary and movable friction plates constituting a single centrally disposed group; a spring resistance; and means for creating lateral pressure from opposite sides inwardly of said group of plates including an outer follower having a pair of inwardly extending wedges located on opposite sides of the group of plates and with the wedge surfaces thereof facing the plates, a spring follower interposed between the spring resistance and the inner ends of the plates, said spring follower having forward extensions straddling the group of plates, and an anti-friction roller on each side of the group of plates having bearing engagement with a wedge surface, a plate and outer end of one of said extensions.

10. In a friction shock absorbing mechanism, the combination with a follower-acting member having an open ended casing at one end thereof; of a plurality of relatively stationary friction plates anchored within said casing against longitudinal movement but freely responsive to lateral pressure; a plurality of alternated friction plates movable longitudinally of the casing, said stationary and movable friction plates constituting a single centrally disposed group; a spring resistance; and means for creating lateral pressure from opposite sides inwardly of said group of plates including, an outer follower having a pair of inwardly extending wedges located on opposite sides of the group of plates and with the wedge surfaces thereof facing the plates, a spring follower interposed between the spring resistance and inner ends of the plates, said spring follower having forward extensions straddling the group of plates, and an anti-friction roller on each side of the group of plates having bearing engagement with a wedge surface, a plate and outer end of one of said extensions, said extensions being laterally flexible.

In witness that I claim the foregoing I have hereunto subscribed my name this 25th day of May 1921.

JOHN F. O'CONNOR.

Witness:
CARRIE GAILING.